United States Patent [19]
Hallett et al.

[11] Patent Number: 5,548,992
[45] Date of Patent: Aug. 27, 1996

[54] LEAK TEST ADAPTER FOR CONTAINERS

[75] Inventors: Brian H. Hallett, Elizabeth; Michael S. Hartley, Canonsburg, both of Pa.

[73] Assignee: The United States of America as represented by the United States Department of Energy, Washington, D.C.

[21] Appl. No.: 487,718

[22] Filed: Jun. 6, 1995

[51] Int. Cl.⁶ .............................. G01M 3/02; G01M 3/20
[52] U.S. Cl. .............................. 73/49.2; 73/40.7; 73/49.8; 73/40
[58] Field of Search .................................. 73/49.2, 49.8, 73/52, 49.3, 40.7, 40, 37

[56] References Cited

U.S. PATENT DOCUMENTS 2,414,113  1/1947  Mapes ........................ 73/49.8
3,995,473  12/1976  Flamand et al. ............. 73/49.2

FOREIGN PATENT DOCUMENTS 280953   1/1971  U.S.S.R. ..................... 73/49.2
1479685  7/1977  United Kingdom .......... 73/49.2

Primary Examiner—Hezron E. Williams
Assistant Examiner—Daniel S. Larkin
Attorney, Agent, or Firm—Thomas Zack; William R. Moser; Paul A. Gottlieb

[57] ABSTRACT

An adapter is provided for facilitating the charging of containers and leak testing penetration areas. The adapter comprises an adapter body and stem which are secured to the container's penetration areas. The container is then pressurized with a tracer gas. Manipulating the adapter stem installs a penetration plug allowing the adapter to be removed and the penetration to be leak tested with a mass spectrometer. Additionally, a method is provided for using the adapter.

19 Claims, 1 Drawing Sheet

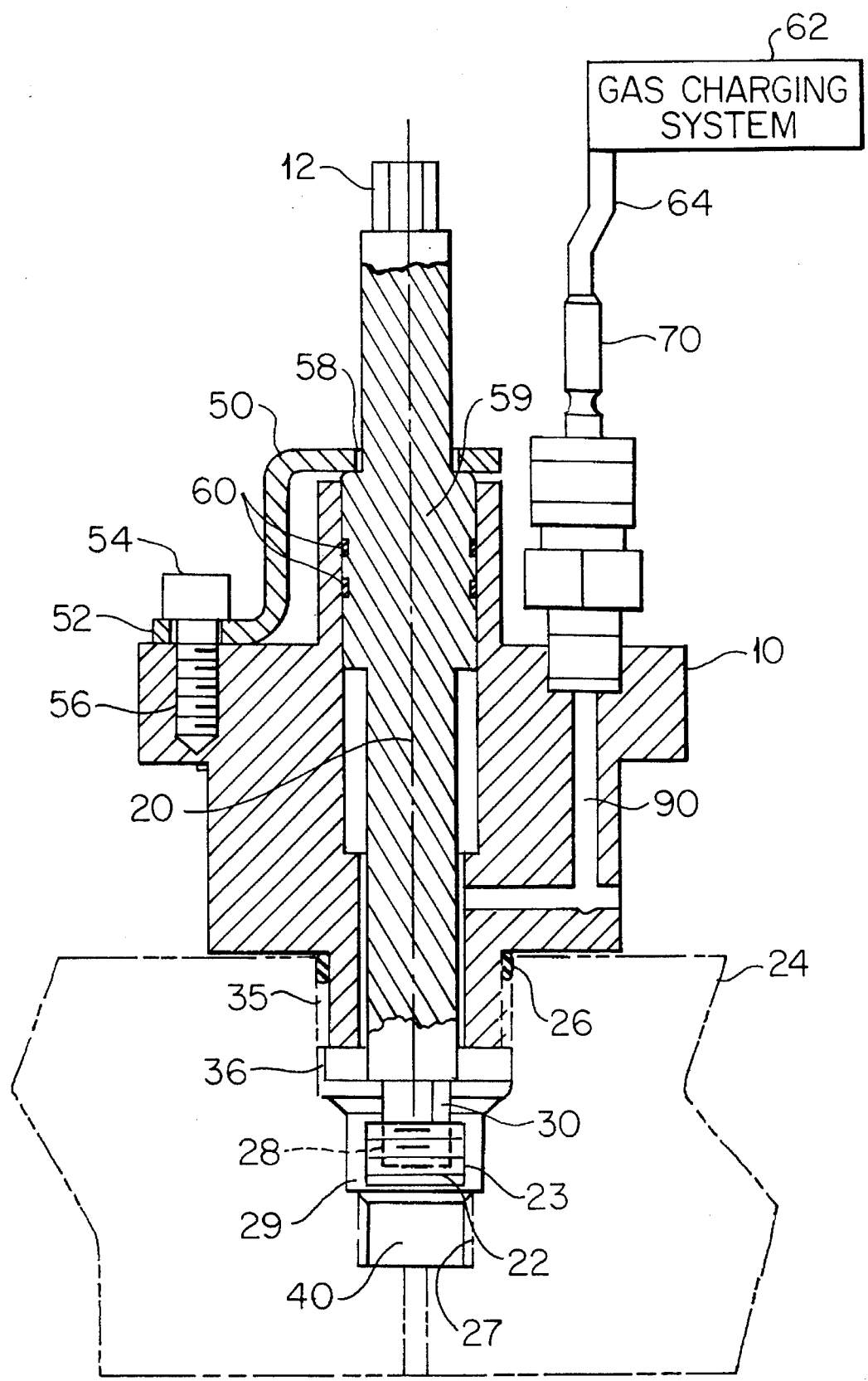

5,548,992

LEAK TEST ADAPTER FOR CONTAINERS

BACKGROUND OF THE INVENTION

1. Field of the Invention

The present invention relates generally to leak test adapters, and more particularly to leak test adapters used with containers such as radioactive material shipping containers.

2. Description of the Prior Art

The Code of Federal Regulations requires leak testing be performed on containers used to store and transport potentially hazardous materials. Such testing is performed to ensure the integrity of the container. For example, in accordance with Nuclear Regulatory Commission policy, shipping containers for radioactive material must be tested for leaks on a regular basis and prior to shipment of any radioactive substance. These tests are generally performed by charging the container with a pressurized tracer gas, such as helium, and testing for leaks with a mass spectrometer. The specific criteria and techniques for leak testing are described in American National Standards Institute, Inc. (ANSI) Standard N14.5.

Charging the container with pressurized gas requires access to the container through a penetration area. This penetration area must later be sealed. Currently, there is no viable means to test this penetration area.

SUMMARY OF THE INVENTION

It is therefore an object of the present invention to provide an adapter which will facilitate charging containers with tracer gases and leak testing the container's penetration areas.

According to one broad aspect of the present invention, there is provided a leak test adaptor for leak testing a container having a penetration area. The leak test adaptor comprises: an adapter body, the adaptor body having a bore hole disposed therethrough, the bore hole defining a vertical axis through the adaptor body; means for securing the adapter body to the container; means for attaching a gas supply; the means for an attachment being affixed to the adaptor body; a fluid passage disposed in the adapter body and in communication with the bore hole at a proximal end and in communication with the means for attaching a gas supply at a distal end; an adapter stem disposed in the bore hole and being movable along the vertical axis; a penetration plug for sealing the penetration area in the container, the penetration plug being disposed on a proximal end of the adapter stem by vacuum grease when not in use and disposed in the penetration area of the container when in use; and a preventing means for preventing the adapter stem from moving beyond a predetermined position along the vertical axis.

According to another broad aspect of the invention, there is provided a method for leak testing a container having a penetration area. The method comprises the steps of: securing the penetration plug to the adapter stem and installing the hex socket of the penetration plug on to the hex key; manipulating the adapter body so that threads on the adapter body cooperate with threads in the container; pulling up the stem until it is restrained by a retainer: supplying a pressurized tracer gas into the container via the adapter body; preventing the adapter stem from being ejected while supplying the pressurized tracer gas by the preventer; pressing the adapter stem into the penetration area and rotating the adapter stem to engage cooperating threads disposed on the penetration plug with those threads disposed in the penetration area; lifting the adapter stem to disengage adapter stem from the penetration plug; removing the leak test adapter from the container; sampling air with the mass spectrometer to determine the presence of tracer gas using a helium sniffer probe or helium mass spectrometer evacuated envelope technique pursuant to American National Standards Institute's Standard N14.5.

Other objects and features of the present invention will be apparent from the following detailed description of the preferred embodiment.

BRIEF DESCRIPTION OF THE DRAWINGS

The single FIGURE in the drawings is a cross sectional view of a leak test adapter constructed in accordance with a preferred embodiment of the invention.

DETAILED DESCRIPTION OF THE PREFERRED EMBODIMENT

With reference to the FIGURE, a leak test adapter is illustrated. An adapter body 10 is threaded with adapter body threads 35. Adapter body threads 35 mate with container threads 36 located in container 24. Adapter body 10 holds an adapter stem 20 having a hex key 30 at a distal end and a hex key 12 at a proximal end. A penetration plug 22 of container 24 has a shape of a cylinder having an internal hex socket 28 extending to a depth approximately ½ of the height of penetration plug 22 and having threads 23 on the exterior surface. Stem retainer 50 prevents adapter stem 20 from being ejected from the assembly during pressurization of container 24. Stem retainer 50 has a proximal end 52 which is attached to a receptor 56 in adapter body 10 by a threaded bolt 54. The distal end 58 of stem retainer 50 has an annular hole for accepting adaptor stem 20. As may be seen, adaptor stem 20 has a cylindrical region 59 which has a larger diameter than the annular hole in stem retainer 50. Thus, this cylindrical region 59 may not pass through the annular hole in stem retainer 50. Quick disconnect 70 is threaded on adapter body 10 in a conventional fashion. Quick disconnect 70 is in fluid communication with penetration cavities 29 and 40 through duct 90. An O-ring 26 is installed in a groove between the lower end of the adapter body and the body threads 35. Two O-rings 60 provide a sliding seal between the large cylindrical region 59 of the stem 20 and the adapter body 10.

To begin installing the leak test adapter onto container 24, penetration plug 22 is secured to adapter stem 20 by engaging adapter stem hex 30 to the penetration plug hex socket 28 using a volume of vacuum grease (not shown). The adapter stem 20 is then manually pulled up until restrained by retainer 50. Adapter body 10 is then manipulated such that adapter body threads 35 are threaded into container threads 36. Assembled in this fashion, penetration cavity 29 is sealed from the environment by an O-ring 26 and stem O-rings seals 60. It should be appreciated that there does not need to be a leak proof seal between adapter body 10 and container 24. One only needs to limit leakage to permit maintaining of a required pressure of slightly greater than 1 atmosphere while installing the penetration plug.

Following installation of adapter body 10 to container 24, a known gas charging system 62, for supplying a pressurized tracer gas, is coupled to quick disconnect 70 via a conduit 64. Pressurized tracer gas is introduced into container 24 by flowing from gas charging system 62, through conduit 64, through quick disconnect 70, duct 90, adapter 10, and slot penetration cavities 29 and 40.

Penetration plug 22 is installed into container 24 following pressurization of the container 24. Penetration plug 22 installation is accomplished by manually pressing adapter stem 20 into penetration cavity 40 and rotating adapter stem 20 with hex key 12. This action engages exterior penetration threads 23 with penetration threads 27. After securing penetration plug 22 to container 24, adapter stem 20 is pulled up to disengage hex key 30 from penetration plug hex socket 28. The gas charging system is de-coupled from quick disconnect 70. Penetration cavities 29, 40 and any other penetrations in the container may then be leak tested using a mass spectrometer 72 or any other method.

It should be appreciated that adapter body 10 may be constructed of 304 stainless steel, adapter stem 20 may be constructed of Nitronic 60®. Quick disconnect 70 may be constructed of brass. Additionally, adapter stem threads 35 may conform to SAE/MS straight thread standards and penetration plug threads 23 may conform to pipe thread standards.

It should also be appreciated that the inventive concept of using an adapter to charge a container and install a penetration plug is applicable to any container requiring introduction of pressurized Gas and leak testing. The mating connections between the adapter and container may be altered as required for any particular application.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A leak test adaptor for leak testing a container having a penetration cavity, said leak test adaptor comprising:

an adapter body, said adaptor body having a bore hole disposed therethrough, said bore hole defining a vertical axis through said adaptor body;

means for securing said adapter body to said container;

means for attaching a gas supply, said means for attaching being affixed to said adaptor body;

a fluid passage disposed in said adapter body and in communication with said bore hole at a proximal end and in communication with said means for attaching a gas supply at a distal end;

an adapter stem disposed in said bore hole and capable of movement along said vertical axis;

a container penetration plug, said penetration plug for sealing said penetration cavity in said container, said penetration plug being disposed on a proximal end of said adapter stem when not in use and disposed in said penetration cavity when in use; and preventing means for preventing said adapter stem from moving beyond a predetermined position along said vertical axis.

2. The device recited in claim 1 wherein said means for securing said adapter to said container comprises: a first threaded region on said adapter body and a second threaded region in said container, said first and second threaded regions cooperating with one another.

3. The device recited in claim 2 wherein said means for securing said adapter to said container further comprises: an "O" ring disposed between said adapter body and said container and stem seals disposed between said adapter stem and said adapter body.

4. The device recited in claim 1 wherein said means for attaching a gas supply comprises a quick disconnect.

5. The device recited in claim 1 wherein said adapter stem comprises an elongated cylindrical element having distal and proximal ends, said cylindrical element having a middle cylindrical region which is larger in diameter than said distal end.

6. The device recited in claim 5 wherein said adapter stem has hex keys disposed on an outer surface of said proximal and distal ends.

7. The device recited in claim 1 wherein said penetration plug comprises a cylindrical body having external threads and an internal hex socket and said penetration plug having an air tight seal formed between said penetration cavity and said penetration plug when in use.

8. The device recited in claim 7 wherein said penetration cavity has threads which cooperate with said external threads of said penetration plug.

9. The device recited in claim 1 wherein:

said adapter stem comprising an elongated cylindrical element having distal and proximal ends, said cylindrical element having a middle cylindrical region which is larger in diameter than said distal end, said adapter stem has a hex key disposed on an outer surface of said proximal and distal ends of said cylindrical element; and said penetration plug comprising a cylindrical body having external threads and an internal hex socket and said penetration plug having one end sealed so that an air tight seal is formed between said penetration cavity and said penetration plug when in use.

10. The device recited in claim 9 wherein said penetration cavity has threads which cooperate with said external threads of said penetration plug.

11. The device recited in claim 1 wherein said preventing means comprises a stem retainer having proximal and distal ends, said proximal end being affixed to said adapter body and said distal end having an annular hole therein, said annular hole for accepting said adapter stem and for preventing a portion of said adapter stem from traveling therethrough.

12. A leak test adaptor for leak testing a container having a penetration cavity, said leak test adaptor comprising:

an adapter body, said adaptor body having a bore hole disposed therethrough, said bore hole defining a vertical axis through said adaptor body;

means for securing said adapter body to said container;

means for attaching a gas supply, said means for attaching being affixed to said adaptor body;

a fluid passage disposed in said adapter body and in communication with said bore hole at a proximal end and in communication with said means for attaching a gas supply at a distal end;

an adapter stem disposed in said bore hole and being movable along said vertical axis, said adapter stem being an elongated cylindrical element having distal and proximal ends, said cylindrical element having a cylindrical region which is larger in diameter than said distal end of said cylindrical element, said adapter stem having a hex key disposed on an outer surface of said proximal and distal ends of said cylindrical element;

a container penetration plug, said penetration plug for sealing said penetration cavity in said container, said penetration plug being disposed on a proximal end of said adapter stem when not in use and disposed in said penetration cavity when in use, said penetration plug comprises a cylindrical body having external threads and an internal hex socket and said penetration plug having one end sealed so that an air tight seal is formed between said penetration cavity and said penetration plug when in use, said hex socket of said penetration plug cooperating with said hex key on said proximal end of said cylindrical element of said adapter stem when not in use; and preventing means, said preventing means for preventing said adapter stem from moving beyond a predetermined position along said vertical axis, said preventing means comprising a stem retainer having proximal and distal ends, said proximal end being affixed to said adapter body and said distal end having an annular hole therein, said annular hole for accepting said adapter stem and for preventing said cylindrical region of said adapter stem from traveling therethrough.

13. The device recited in claim 12 wherein said means for securing said adapter to said container comprises: a first threaded region on said adapter body and a second threaded region in said container, said first and second threaded regions cooperating with one another.

14. The device recited in claim 13 wherein said means for securing said adapter to said container further comprises: an "O" ring disposed between said adapter body and said container and stem seals disposed between said adapter stem and said adapter body.

15. The device recited in claim 12 wherein said means for attaching a gas supply comprises a quick disconnect.

16. The device recited in claim 12 wherein said penetration cavity has threads which cooperate with said external threads of said penetration plug.

17. A method for leak testing a container, having a penetration cavity, with a leak test adaptor and a mass spectrometer, said leak test adaptor comprising at least an adapter body, an adapter stem, a penetration plug and a preventer; said method comprising the steps of:

securing said penetration plug to said adapter stem by engaging a hex key disposed on said adapter stem with a hex socket on said penetration plug;

manipulating said adapter body so that threads on said adapter body cooperate with threads in said container;

manually pulling up the stem until restrained by a retainer;

supplying a pressurized tracer gas into said container via said adapter body;

preventing said adapter stem from being ejected while supplying said pressurized tracer gas by said preventer;

pressing said adapter stem into penetration cavity and rotating said adapter stem to engage cooperating threads disposed on said penetration plug with those threads disposed in said penetration area;

lifting said adapter stem to disengage adapter stem from said penetration plug;

removing said leak test adapter from said container;

sampling air with said mass spectrometer to determine the presence of tracer gas.

18. The method recited in claim 17, further comprising the step of maintaining a pressure of slightly greater than 1 atmosphere in said container while said adapter body is manipulated.

19. The method recited in claim 17 wherein the step of supplying a pressurized tracer Gas comprises the steps of:

connecting a conduit to a quick disconnect mounted on said adapter body;

connecting said conduit to a gas charging system; and allowing said tracer gas to flow from said gas charging system, through said conduit, through said quick disconnect and adapter body via a duct and into said penetration cavity.

\* \* \* \* \*